United States Patent [19]

Krikorian et al.

[11] Patent Number: 5,225,841
[45] Date of Patent: Jul. 6, 1993

[54] GLITTERING ARRAY FOR RADAR PULSE SHAPING

[75] Inventors: Kapriel V. Krikorian, Agoura; Robert A. Rosen, Agoura Hills; Gib F. Lewis, Manhattan Beach, all of Calif.

[73] Assignee: Hughes Aircraft Company, Los Angeles, Calif.

[21] Appl. No.: 722,023

[22] Filed: Jun. 27, 1991

[51] Int. Cl.[5] .......................... G01S 7/282; H01Q 3/28
[52] U.S. Cl. .................................... 342/204; 342/372
[58] Field of Search .............. 342/202, 204, 368, 374, 342/377, 372

[56] References Cited

U.S. PATENT DOCUMENTS

| | | | |
|---|---|---|---|
| 3,267,472 | 8/1966 | Fink | 342/368 |
| 4,050,074 | 9/1977 | Toman | 342/374 X |
| 4,124,852 | 11/1978 | Steudel | 343/854 |
| 4,129,870 | 12/1978 | Toman | 342/374 X |
| 4,451,831 | 5/1984 | Stangel et al. | 342/374 |

*Primary Examiner*—Gilberto Barrón, Jr.
*Attorney, Agent, or Firm*—L. A. Alkov; W. K. Denson-Low

[57] ABSTRACT

Variable array thinning to achieve efficient radar pulse shaping for advanced radar waveforms such as pulse burst or monopulse doppler. At the beginning of the pulse, only a few elements, spread out over the array, are turned on. The effective amplitude can be controlled with precision because each element is either off or at saturation. High efficiency is maintained because the off-state of each element is long enough so that prime power is not consumed.

15 Claims, 3 Drawing Sheets

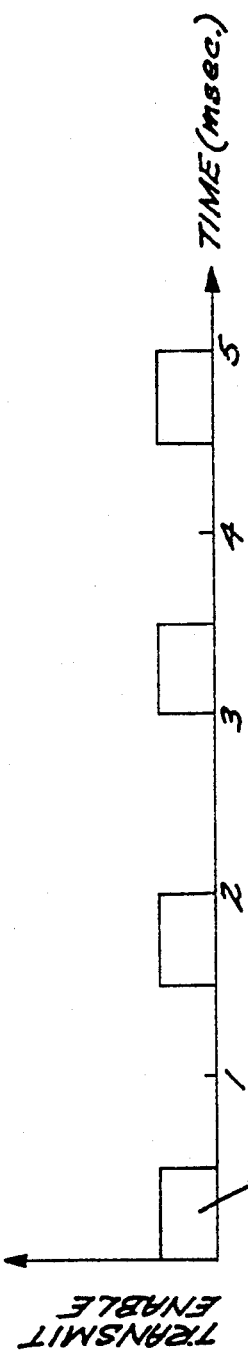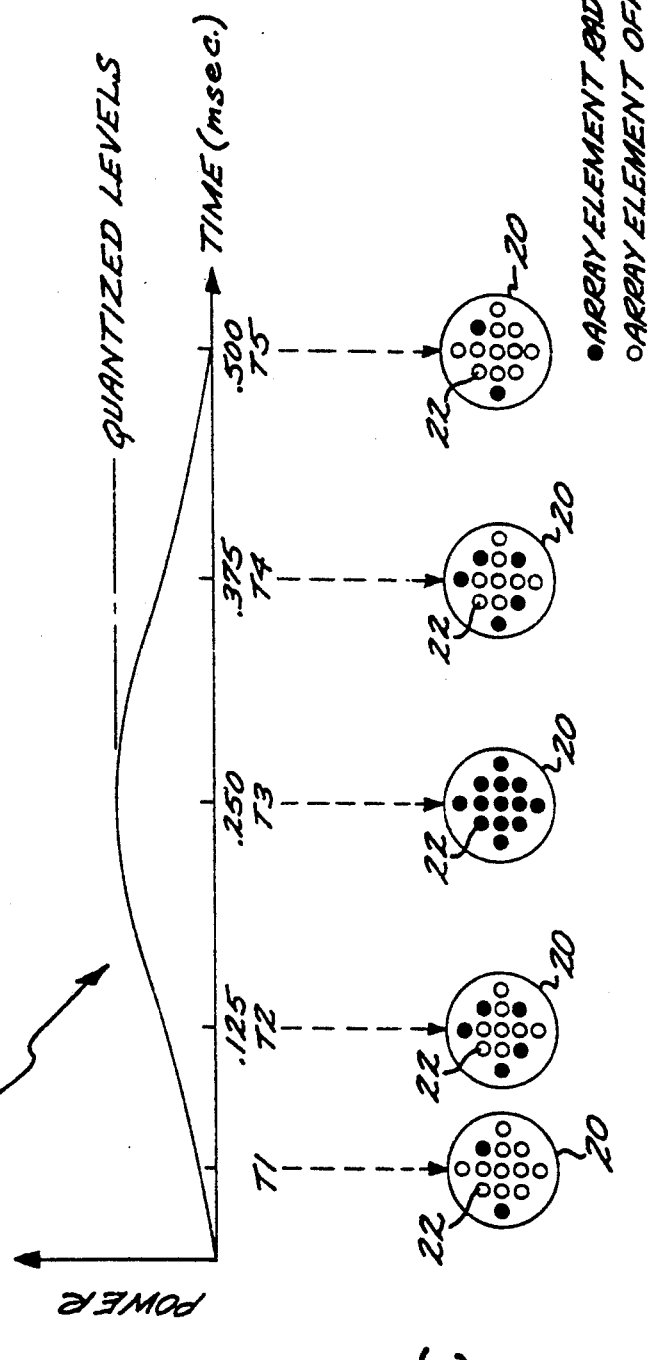
FIG. IA
FIG. IB
FIG. IC

GLITTERING ARRAY FOR RADAR PULSE SHAPING

BACKGROUND OF THE INVENTION

The present invention is an advancement in the field of active phased array radar systems.

In advanced radar systems, new waveforms such as the monopulse (single pulse) doppler waveforms can achieve enhanced sensitivities. The monopulse doppler waveform is characterized by a high duty factor and low pulse repetition frequency (PRF). Doppler information can be obtained from the return of a single transmitted pulse. A related type of waveform is the pulse burst waveform. This waveform is similar to the monopulse doppler waveform, except that the pulse is divided into many short bursts. The advantage is that receive operations can occur during the pulse "off" times during the pulse period, instead of being blanked during the entire long transmit pulse as is the case for the monopulse waveforms.

Postulated scenarios employing such new waveforms include very long ranges and heavy electronic countermeasures (ECM). Monopulse doppler waveforms are especially effective in these scenarios. Although transmitter spectral purity, distortion, sidelobes, analog-to-digital (ADC) and processor quantization and processing requirements can be met, the main challenge in implementing arrays with this waveform and other advanced waveforms is precise transmit pulse shaping.

An exemplary monopulse doppler waveform is illustrated in FIGS. 1A and 1B. FIG. 1A illustrates the transmit enable status as a function of time, showing the high duty factor and low PRF of the waveform. FIG. 1B shows the power distribution as a function of time for an exemplary one of the transmitted pulses, showing the pulse shaping. It is known that such pulse shaping is desirable in phased array radars in look-down scenarios, since slow moving target detection would be degraded in detection of slow moving targets. Ground clutter from the DC doppler filter will contaminate the lower non-DC filters, unless such pulse shaping is employed. Shaping is also useful in some conventional waveform applications to reduce the long range clutter settling time.

Transmit pulse shaping must be very precise in order to achieve adequate mainlobe clutter rejection. Also, to minimize array prime power and cooling requirements, it is important that high efficiency (i.e., minimal energy use) be maintained at the tapered edges.

In an active phased array radar system, one method of generating shaped pulses is to continuously vary the transmit power of each active element over the pulse length. However, with this method, it is extremely difficult to control the element amplitudes with sufficient precision. Furthermore, there is likely to be incidental phase modulation which also degrades clutter rejection.

Another method of achieving pulse shaping is duty factor modulation. The idea is to form the desired long shaped pulse as a series of many subpulses. The center-to-center spacing of the subpulses is constant, but the subpulse widths are reduced away from the long pulse center. This technique allows more precise control of the effective amplitude taper. However, the efficiency is poor because the elements as likely to require full power even during the gaps between subpulses.

It is therefore an object of the invention to provide a means for precise and efficient transmit pulse shaping in an active phased array radar.

SUMMARY OF THE INVENTION

This and other objects and advantages are obtained in an active array system comprising a large number of radiating elements dispersed over the radiating aperture by a transmit pulse shaping circuit which precisely shapes individual pulses. The pulse shaping circuit is characterized in that, for a given pulse, the number of radiating elements which are turned on is gradually increased at the beginning of a transmit pulse interval until all elements are turned on at the middle of the pulse interval, and thereafter the number of elements which are turned on is gradually decreased until no elements are turned on at the end of the pulse interval. This type of array is described as a "glittering array."

In a preferred embodiment, the transmitting elements which are turned on from the interval beginning until all elements are on are randomly dispersed over the element array aperture. Moreover, the elements are turned off after the middle of the pulse interval in inverse order to the order in which they were turned on.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 1A and 1B illustrate typical monopulse doppler waveform characteristics.

FIG. 1C illustrates active array illumination for pulse shaping in accordance with the invention.

DETAILED DESCRIPTION OF THE PREFERRED EMBODIMENT

Figure 2:
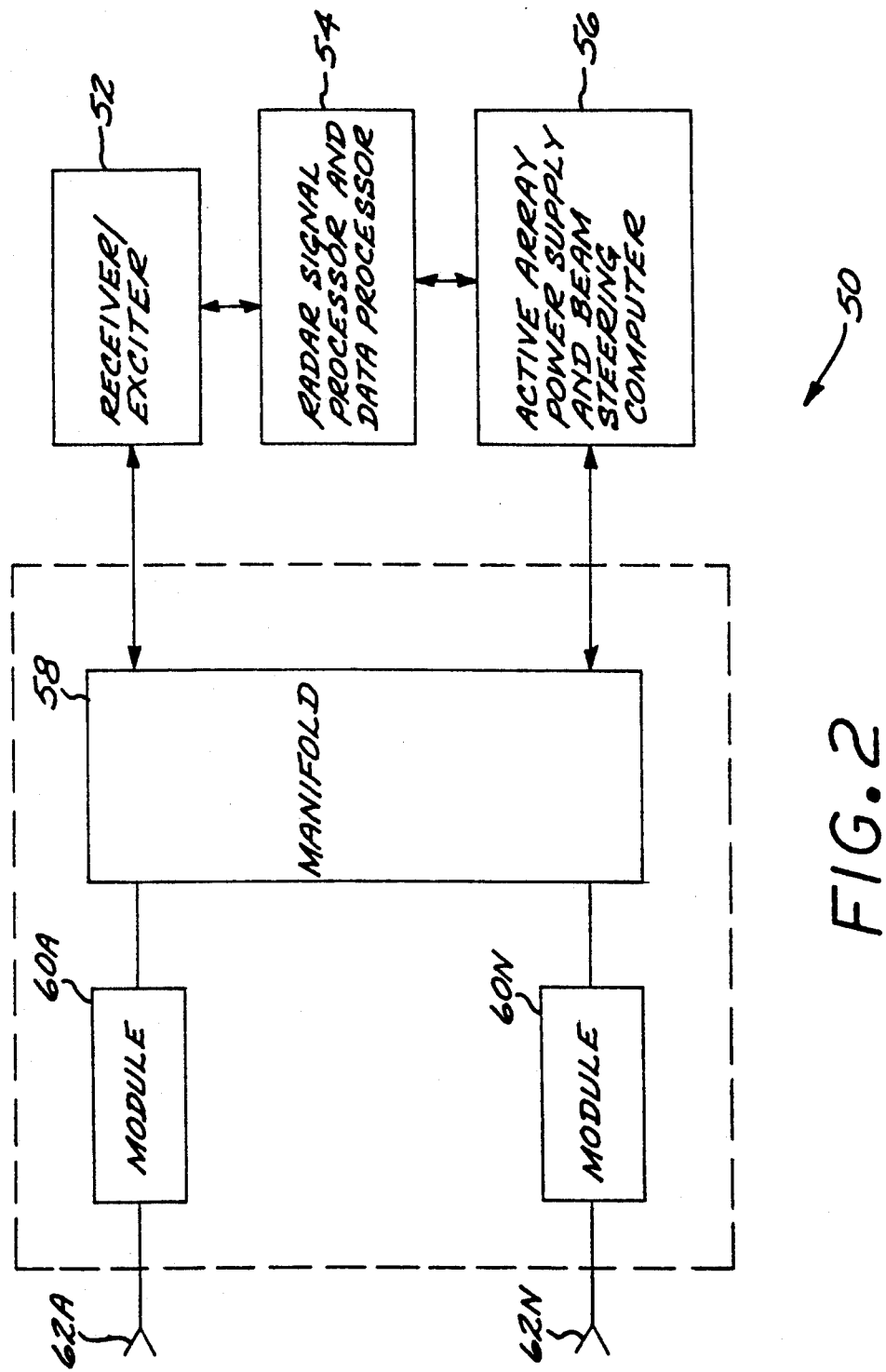
FIG. 2 is a simplified block diagram of an active array radar system employing the invention.

In the "glittering" array approach in accordance with the invention, variable array thinning is used to modulate the effective radiated power (ERP) in the desired manner. FIG. 1C illustrates a simplified array 20 comprising a small number of discrete elements 22 arranged in a circular aperture. In this figure a darkened element represents an element which is radiating or "on", and a non-darkened element represents an element which is not radiating or "off" at that particular instant of time. The status of the array elements is shown for five discrete instants of time during a single pulse. Thus, at the beginning of the pulse, at time T1, only a few (two) array elements, spread out over the array, are turned on. At time T2, more elements (five) of the array are turned on. At time T3, at the middle of the pulse, all elements of the array are turned on. Time T4 corresponds to time T2, and the same array elements are turned on as were turned on for time T2. Similarly, time T5 corresponds to time T1 in the particular array elements being turned on.

As with duty factor modulation, the effective amplitude can be controlled with precision because each element is either off or on in saturation. However, high efficiency is maintained with the glittering array, because switching elements off virtually eliminates elemental power consumption. If a variable attenuator was used instead, significant savings in power would not be realized. Furthermore, if waveform duty factor modification were used, implementation of the timing control circuitry would be difficult and would not result in equivalent savings in power compared to the glittering array.

With this approach, the gain as well as the power is proportional to the number of "on" elements, n. Thus, the effective pulse amplitude, a, is also proportional to n. The gain reduction at the pulse edges leads to a loss, given by:

$$L = a_0 \overline{a} / \overline{a^2}$$

where
$\underline{a}$ = average amplitude,
$\overline{a^2}$ = average squared amplitude, and
$a_0$ = peak amplitude.

For a $\cos^2$ pulse shape, this loss is $4/3 = 1.2$ dB. It should be noted that the duty factor modulation technique has a similar loss (in addition to the loss due to the power consumed in the off states), because a portion of its energy is placed at unusable frequencies.

For random array thinning, i.e., for instances in which the array elements to be turned on during a particular instant are randomly chosen, the reduced gain is manifested in a more or less uniform additive background sidelobes; the beamwidth is unchanged. (In contrast, if the array elements were turned on in an orderly fashion, starting from the center of the array to the edges of the array, a broadening of the main beam will result which can significantly degrade performance against mainlobe clutter.) Generally, these additive transmit sidelobes are tolerable because monopulse doppler is a low PRF waveform and thus automatically rejects near range sidelobe clutter. Rapid fluctuation of the background sidelobes will also aid the rejection of clutter. If additionally required, non-random thinning can reduce the sidelobes in directions not important for clutter rejection. Various element switching patterns can be implemented to fine tune to specific applications.

Referring now to FIG. 2, a simplified block diagram of an active array radar system which may employ the invention is shown. Here, the system 50 comprises a receiver/exciter 52, a radar signal processor and data processor 54 and an active array power supply and beam steering computer 56. The receiver/exciter 52 provides the transmitter signal to an RF manifold, which distributes the transmit signal to the various active modules 60A-60N. The modules 60A-60N are in turn connected to the respective radiating elements 62A-62N. The modules 60A-60N include variable phase shifter circuits which act in response to commands from the beam steering computer 56 to steer a transmit or receive beam in a desired direction. The manifold 58 in turn combines the signals received from the elements 62A-62N and provides the combined received signal to the receiver/exciter 52 for processing by the processor 54.

The operation already described of the system 50 is conventional. In accordance with the invention, the processor 54 and/or the computer 56 further comprises means for turning the transmit modules on and off to obtain the glittering array operation described above. Alternatively, the modules may contain the control circuitry. While there are many ways in which such a capability could be obtained, the embodiment of FIG. 2 employs a synchronization pulse generated periodically during a given pulse period and provided to the respective modules. Each module in turn includes a means for counting the successive pulses, which are received periodically, say at one microsecond intervals, and based on the count, turning on only a predetermined set of modules corresponding to the present count value. Each set can be represented by data stored in a memory addressed by the count value.

Figure 3:
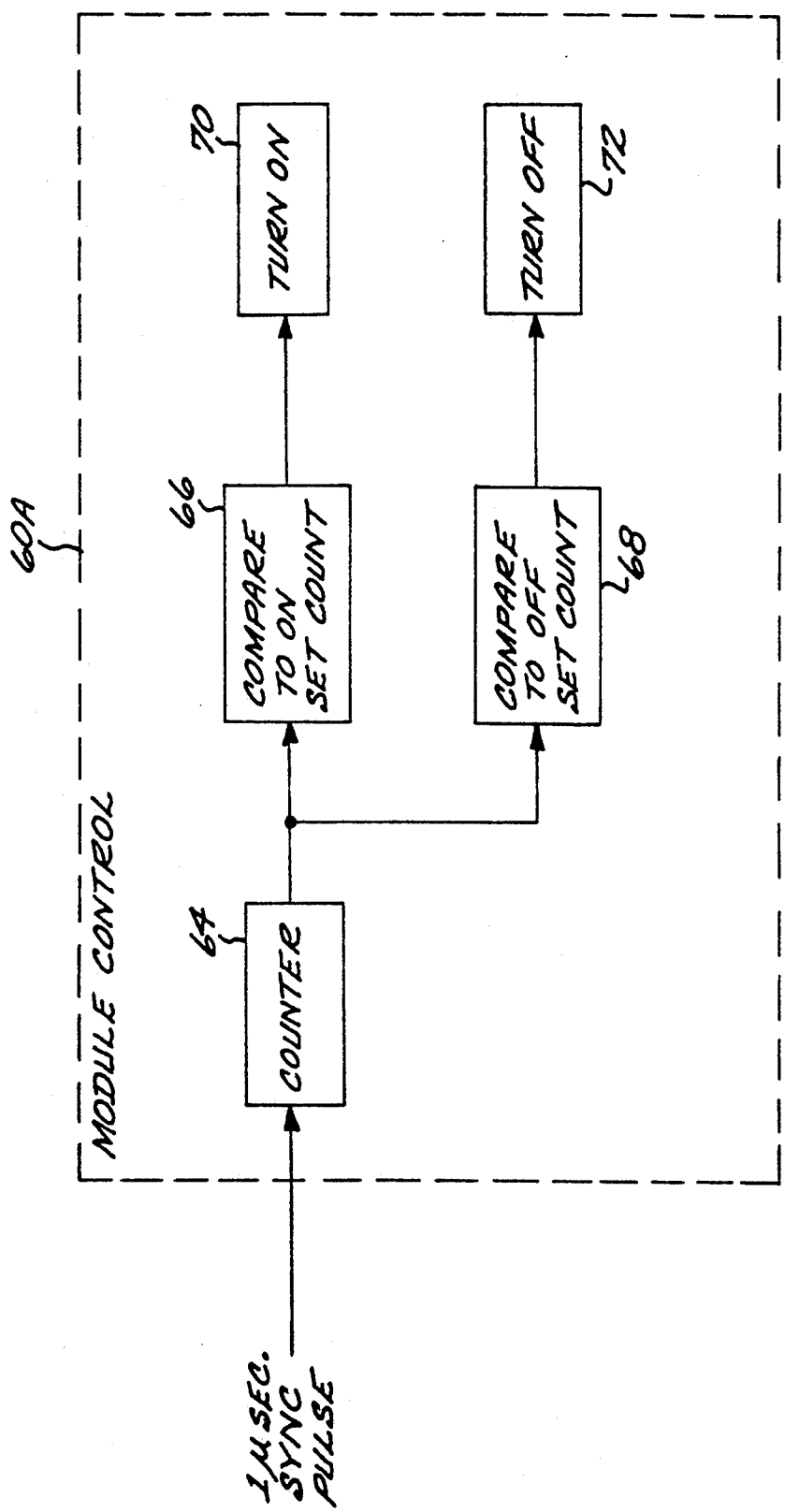
FIG. 3 is a simplified block diagram of one possible embodiment of control circuitry for a transmit module comprising the system of FIG. 2.

In one particular embodiment, represented in FIG. 3, an exemplary module 60A is responsive to synchronization pulses received from the computer 56, received at, say, one microsecond intervals. The module 60A includes a counter 64 which maintains a count of the number of synchronization pulses received since the initiation of exciter pulse operation. The counter state value is compared at comparator 66 to a preset value when the module is to be turned on, and at comparator 68 to a preset value at which the module is to be turned off. Turn on circuitry 70 is triggered to turn the module on when the counter state equals the preset value for comparator 66. Turn off circuitry 72 is triggered to turn the module off when the counter state equals the preset value for comparator 68. Each of the modules has corresponding elements, but the particular preset values for turning on and turning off a particular module will vary, depending on the preselected random distribution of the elements over a particular pulse. After an exciter pulse is terminated, each counter 64 state is reset.

It is understood that the above-described embodiments are merely illustrative of the possible specific embodiments which may represent principles of the present invention. Other arrangements may readily be devised in accordance with these principles by those skilled in the art without departing from the scope and spirit of the invention. For example, amplitude tapering in accordance with the invention can be used with conventional waveforms other than monopulse doppler and pulse burst waveforms to reduce the clutter settling time. Thus, the invention is not limited to use with monopulse doppler and pulse burst waveforms.

What is claimed is:

1. In an active array system comprising a large number of radiating elements dispersed over the radiating aperture and employing transmit pulse shaping to precisely shape individual pulses, a pulse shaping circuit characterized in that the number of radiating elements which are turned on is gradually increased at the beginning of a transmit pulse interval until all elements are turned on at the middle of the pulse interval, and thereafter the number of elements which are turned on is gradually decreased until no elements are turned on at the end of the pulse interval.

2. The pulse shaping circuit of claim 1 wherein the elements which are turned on from the beginning of said interval until all elements are on are randomly dispersed over the array aperture.

3. The pulse shaping circuit of claim 1 wherein the elements which are turned on from the beginning of said interval until all elements are turned on are dispersed over the array aperture based on a precomputed switching pattern.

4. The pulse shaping circuit of claim 1 further characterized in that the radiating elements are either off or fully on.

5. The system of claim 1 wherein said active array system is further characterized in that it employs a monopulse doppler waveform.

6. The system of claim 1 wherein said active array system is further characterized in that it employs a pulse burst waveform.

7. The system of claim 1 further characterized in that the elements are turned off after the middle of the pulse interval in inverse order to the order in which they were turned on.

8. An active array radar system, comprising:
a plurality of radiating elements defining an array aperture;
a radar exciter for generating a transmit pulse waveform;
a plurality of active array modules, each said module including a transmit section for amplifying said transmit pulse waveform, and wherein the transmit section of each one of said modules is coupled to a corresponding one of said radiating elements;
means for electrically connecting said plurality of modules to said exciter; and
means for selectively and independently turning on and off said transmit sections of said modules during the period of a transmit pulse to achieve transmit pulse shaping, such that the number of transmit sections which are turned on is gradually increased at the beginning of a transmit pulse interval until all sections are turned on at the middle of the pulse interval, and thereafter the number of transmit sections which are turned on is gradually decreased until no transmit sections are turned on at the end of the pulse interval.

9. The system of claim 8 wherein the transmit sections which are turned on from the interval beginning until all transmit sections have been turned on are connected to radiating elements which are randomly dispersed over said array aperture.

10. The system of claim 8 wherein the elements which are turned on from the beginning of said interval until all elements are turned on are dispersed over the array aperture based on a predetermined pattern.

11. The system of claim 8 wherein said transmit sections are turned off after the middle of said pulse interval in inverse order to the order in which said sections were turned on.

12. The system of claim 8 wherein said transmit sections are either off or fully on, driven to saturation.

13. The system of claim 8 wherein said means for selectively turning on and off said transmit sections comprises:
means for generating a synchronization pulse periodically during the transmit pulse interval;
counter means associated with each module for counting the number of pulses generated during said interval;
means associated with each module and responsive to the number of pulses counted during a particular pulse interval for turning on the transmit section of said respective module when the number of synchronization pulses counted reaches a particular turn on number for that particular module, and for turning off the transmit section of said particular module when the number of synchronization pulses counted reaches a particular turn-off number for that particular module.

14. The system of claim 8 wherein said transmit pulse waveform comprises a monopulse doppler waveform.

15. The system of claim 8 wherein said transmit pulse waveform comprises a pulse burst waveform.

* * * * *